Jan. 30, 1934.　　　L. H. LARSEN　　　1,945,050
AUTOMATIC STOKER
Filed March 30, 1932　　　8 Sheets-Sheet 1

Fig.1.

Inventor:
Louis H. Larsen.
By F. V. Winter
Attorney

Jan. 30, 1934. L. H. LARSEN 1,945,050
AUTOMATIC STOKER
Filed March 30, 1932 8 Sheets-Sheet 7

Inventor:
Louis H. Larsen.
By F. V. Winters.
Attorney

Patented Jan. 30, 1934

1,945,050

UNITED STATES PATENT OFFICE 1,945,050

AUTOMATIC STOKER

Louis H. Larsen, Englewood, N. J.

Application March 30, 1932. Serial No. 602,064

3 Claims. (Cl. 110—113)

This invention relates generally to fuel feeders, and the improvements are directed to a mechanical stoker for automatically feeding fuel to all hand-fired boilers and furnaces.

A primary object of the invention resides in the provision of novel automatic means whereby fuel may be introduced into a boiler or furnace.

Another object is to provide means whereby hand firing methods may be resorted to at any time without disassembling the aforementioned automatic means.

Another object of the invention is to provide an apparatus of the above-mentioned character which may be attached to the well-known types of boilers or furnaces without materially altering the ordinary structure thereof.

A further object of the invention resides in the provision of a novel form of casing, said casing being adapted to be attached to the front of a furnace to prevent the admission of air thereto during the operation of the shovels within said casing.

Still another object resides in the provision of means, operatively connected with the door of the casing, whereby the opening of said door renders the shovel functioning means inoperative and stays the operation of the shovels, said means further operating to restore the normal operation of the stoker when the door is closed.

A still further object of the invention is to provide means for oscillating the shovels beneath a metering device to receive a pre-determined charge of fuel.

Another feature of the invention resides in the provisions of means adapted to be intermittently and progressively energized for the regulation and spreading of the fuel from the front to the back of the grate of a furnace.

Still another object is to provide an automatic stoker adapted to be attached to various sizes of furnaces of different makes used for marine and other purposes, and which is adapted to handle all kinds of suitable fuels.

These and other objects of the invention will be more fully understood from the following detail description and accompanying drawings, in which.

Referring now more in detail to the accompanying drawings, wherein like characters of reference denote similar parts throughout the several views, let 5 indicate generally a portion of a boiler, which, in the present instance is of the well-known Scotch-type, said boiler including the usual ash pit 6 and the grate section 7, and as will presently appear it is proposed to provide a mechanism wherein the proper amount of fuel will be distributed evenly from the front to the rear of said grate and transversely thereof, to the end that a suitable fire may be maintained in said boiler in accordance with the demands of the service. It will be understood that said boiler may contain one or two furnaces, while in larger types of boilers as many as four furnaces may be employed, each furnace in either instance being equipped with a shovel with suitable mechanism for operating the same.

Figures 7, 13:
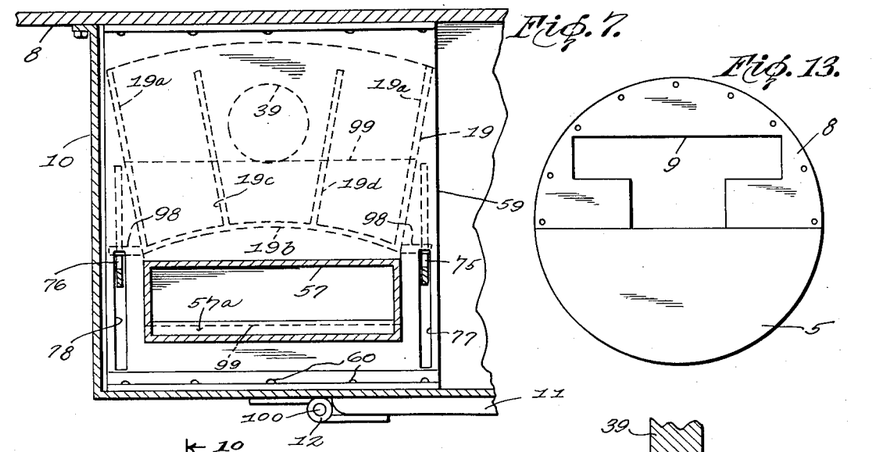
Fig. 7 is a horizontal sectional view taken on the line 7—7 of Fig. 3.
Fig. 13 is a front elevation of a Scotch furnace showing a specially prepared plate affixed thereto.

As clearly shown in Fig. 13, the upper frontal portion of said boiler 5 is provided with a suitably affixed plate 8, the latter presenting a T-shaped opening 9 whereby the fuel may be introduced into the boiler either by the automatic shovels or by hand-firing methods, as will presently appear. To said plate 8 is secured a casing 10 which closes the opening 9 in said plate 8 to prevent the entrance of air into said furnace, though access to the interior of the casing may be had by means of the door 11 which is hingedly carried by the casing 10, as indicated at 12.

In the present embodiment of the invention two shovels and the individual means for operating each shovel are shown. Hence, the boiler illustrated includes two furnaces, one shovel being provided for each furnace, but as stated hereinbefore the number of shovels will vary in accordance with the number of furnaces in each boiler. In that said casing conforms to the opening 9, the interior thereof includes lateral chambers 13 and 14, (see Figs. 3 and 6), and chamber 15, extending downwardly below said chambers 13 and 14 and being closed by said door 11. All of said said hoppers being of suitable proportions to store chambers are intercommunicating and readily accessible. The front upper portion of said casing 10 is provided with juxtaposed extensions 15 and 16 leading to hoppers 17 and 18 respectively, a large quantity of the fuel being handled.

As the shovels and their individual operating means are similar, the description will be limited to a single shovel and its operating means and in this connection it will be observed that each of the shovels 19 operates in the chamber 13 or 14 and each is positioned directly in front of that portion of said opening 9 leading to a furnace in said boiler.

Figure 1:
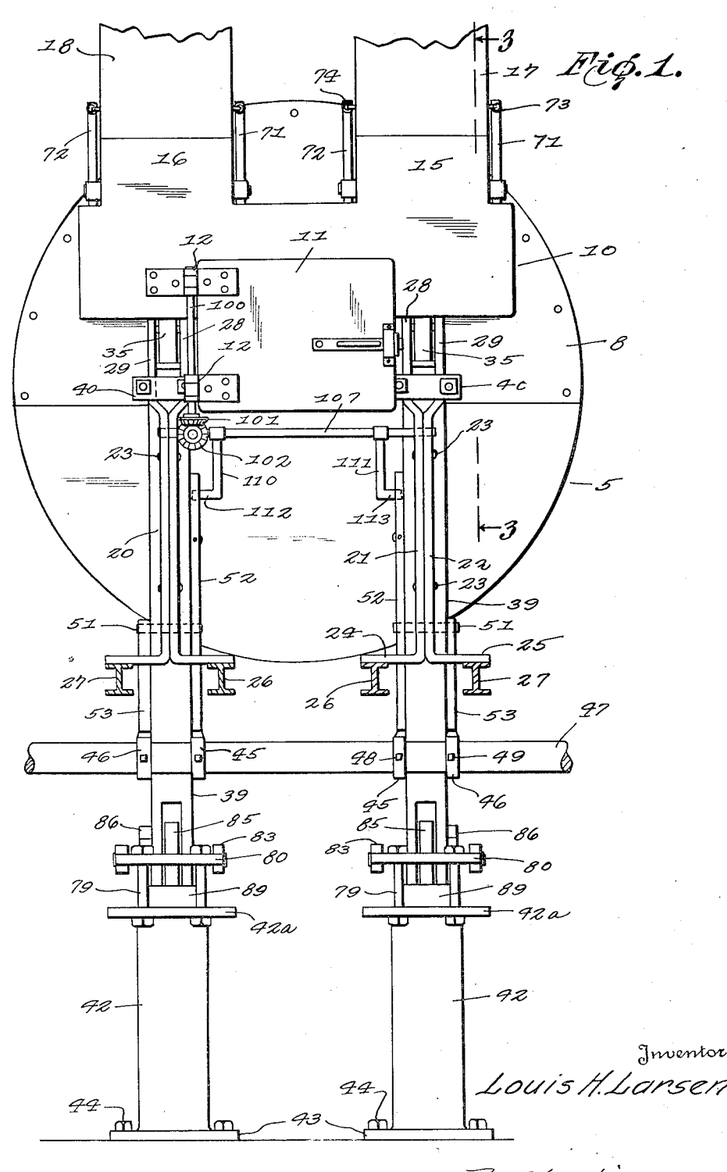
Figure 1 is a front elevation of my novel automatic stoker.
Figure 6:
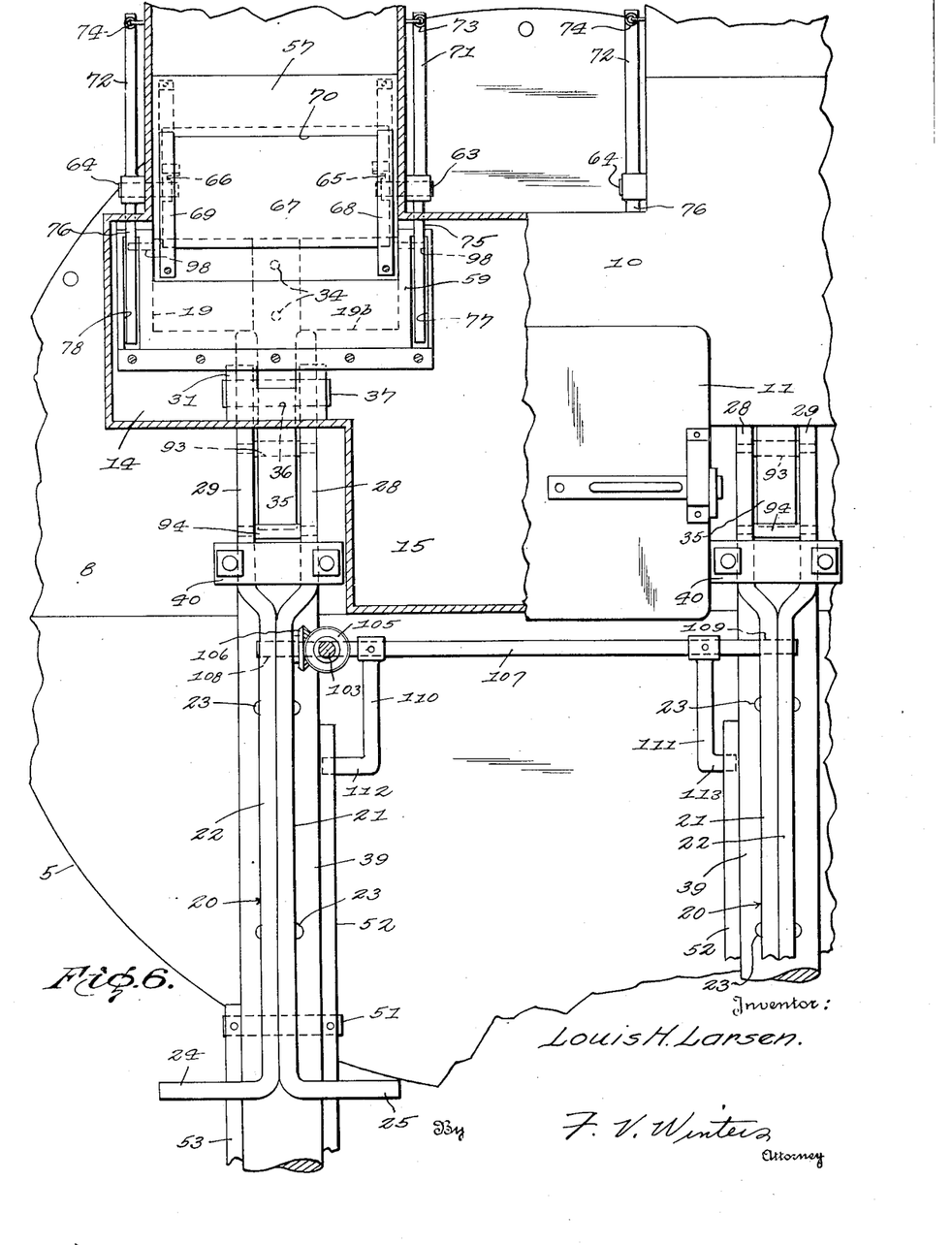
Fig. 6 is an enlarged view of the upper portion of the stoker, partly in elevation and partly in section to show the interior arrangement and the position of the parts contained in one portion of the casing.

The supported means for each of said shovels 19 includes a standard 20 embodying members 21 and 22, secured together by means of rivets 23, or the like, and having their lower extremities bent laterally to present foot portions 24 and 25 which rest on the beams 26 and 27. As shown in Figs. 1 and 6 the upper ends of said members 21 and 22 are spaced apart to present a fork embodying branches 28 and 29 which extend through an opening 30 in the casing, where the extremities of said branches 28 and 29 are affixed within a clip 31, as indicated at 32, (see Fig. 3). The shovels 19 are each provided with a depending bracket 33, said bracket being suitably affixed to its particular shovel, as indicated at 34, (see Fig. 6), and having an arcuately shaped projection 35, extending between said branches 28 and 29, said projection 35 being provided with a transverse aperture 36 for the reception of pin 37 passing through alined apertures in the sides of clip 31 and the aforesaid branches 28 and 29. In view of this arrangement, each of said shovels is pivotally mounted on each of the pins 37 and as said clip 31 is affixed to the plate 8, by means of the suitable fastening means 38, (see Fig. 3), a rigid and sturdy support is provided.

Figure 3:
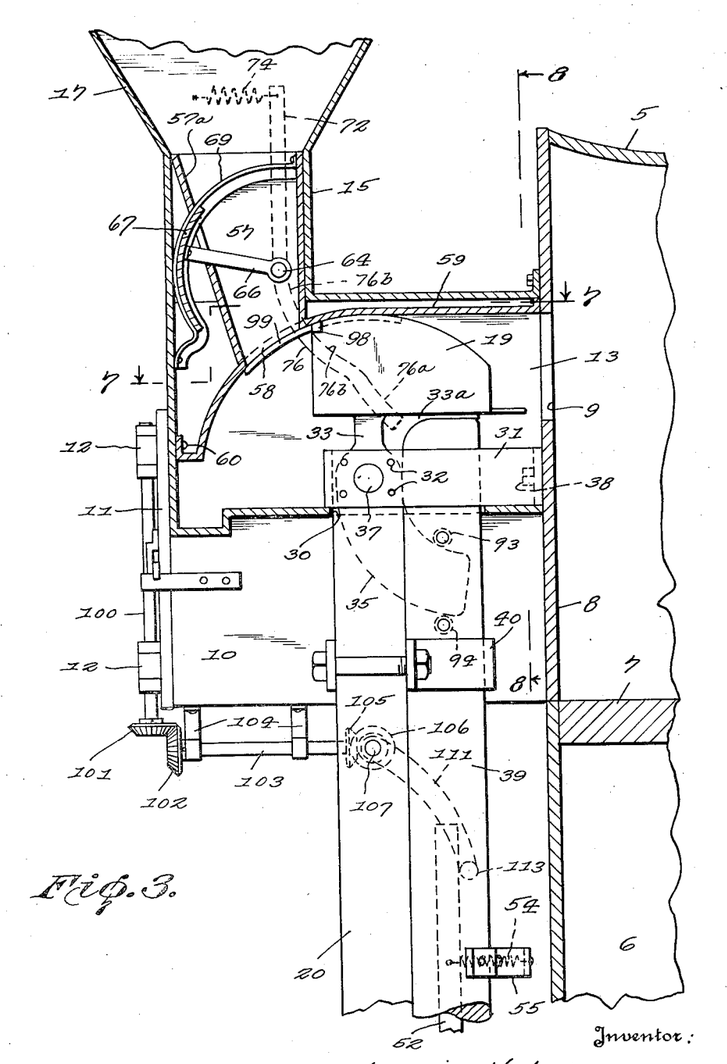
Fig. 3 is a sectional view, slightly enlarged, taken on the line 3—3 of Fig. 1, showing one of the shovels in the position subsequent to the discharge of the fuel therefrom.

On inspection of Fig. 1 it will be observed that each of the standards 20 supports a rod 39, whose upper end also extends through said opening 30 in said casing so that its end face abuts the web portion 33a of said bracket 33, (see Fig. 3). The upper portion of said rod 39 is held in position against the standard 20 by means of a clamp 40, though the engagement is such that reciprocation of said rod 39 may take place, as will presently appear.

Figure 9:
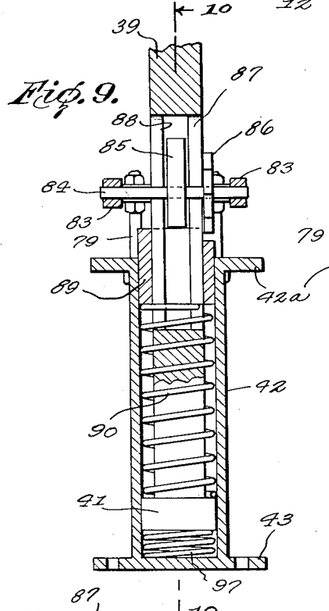
Fig. 9 is an enlarged sectional view of one of the cylinders to show the closely associated operating parts.
Figure 10:
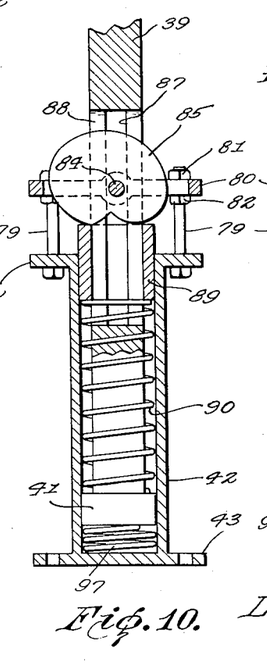
Fig. 10 is a sectional view taken on the line 10—10 of Fig. 9.
Figure 11:
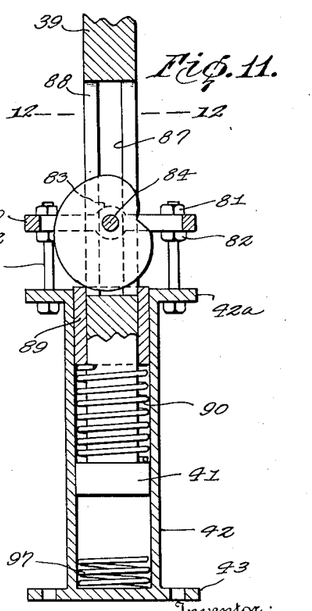
Fig. 11 is a view like unto Fig. 10, but showing the parts in another position.

As shown in Figs. 9 to 11, the lower end of said rod is provided with a piston-like head 41 positioned in the cylinder 42, the latter being provided with a base flange 43 affixed to a floor by means of bolts 44. Thus, each of said rods 39 is held in position by means of the clamp 40 and the engagement of the head 41 within the walls of said cylinder 42.

As pointed out in the objects of the invention, it is proposed to provide means whereby said rods 39 may be elevated to oscillate the shovels toward the front of the casing so that said shovels may receive their charges of fuel. Also it is proposed to provide means whereby the shovels may be oscillated back to the position shown in Fig. 3 so that their charges may be literally thrown over the grates of the furnaces.

The means for elevating said rods 39 includes a pair of juxtaposed wiper elements 45 and 46, which are adjustably carried by a rotatable shaft 47, by means of bolts 48 and 49. Said shaft 47 may be rotated by any suitable means available at the installation point of the apparatus and as said wipers 45 and 46, during a part of their rotation, straddle said rod 39, it is obvious that an abutment within their path of rotation and affixed to said rod will cause an elevation of the latter. In the present embodiment, the aforesaid abutment comprises a member 50, pivotally connected to said rod, as indicated at 51, and including an inner leg 52 and an outer leg 53, (see Fig. 1), the extremities of the inner leg 52 and the outer leg 53 being within the path of rotation of said wipers 45 and 46 respectively. Said abutment 50 is held in an erect position by means of spring 54 having one end affixed to the upper portion of leg 52 and its other end secured to a clamp 55 secured to rod 39, and a stop 56 abutting leg 53, (see Figs. 2 and 3).

Figures 2, 15:
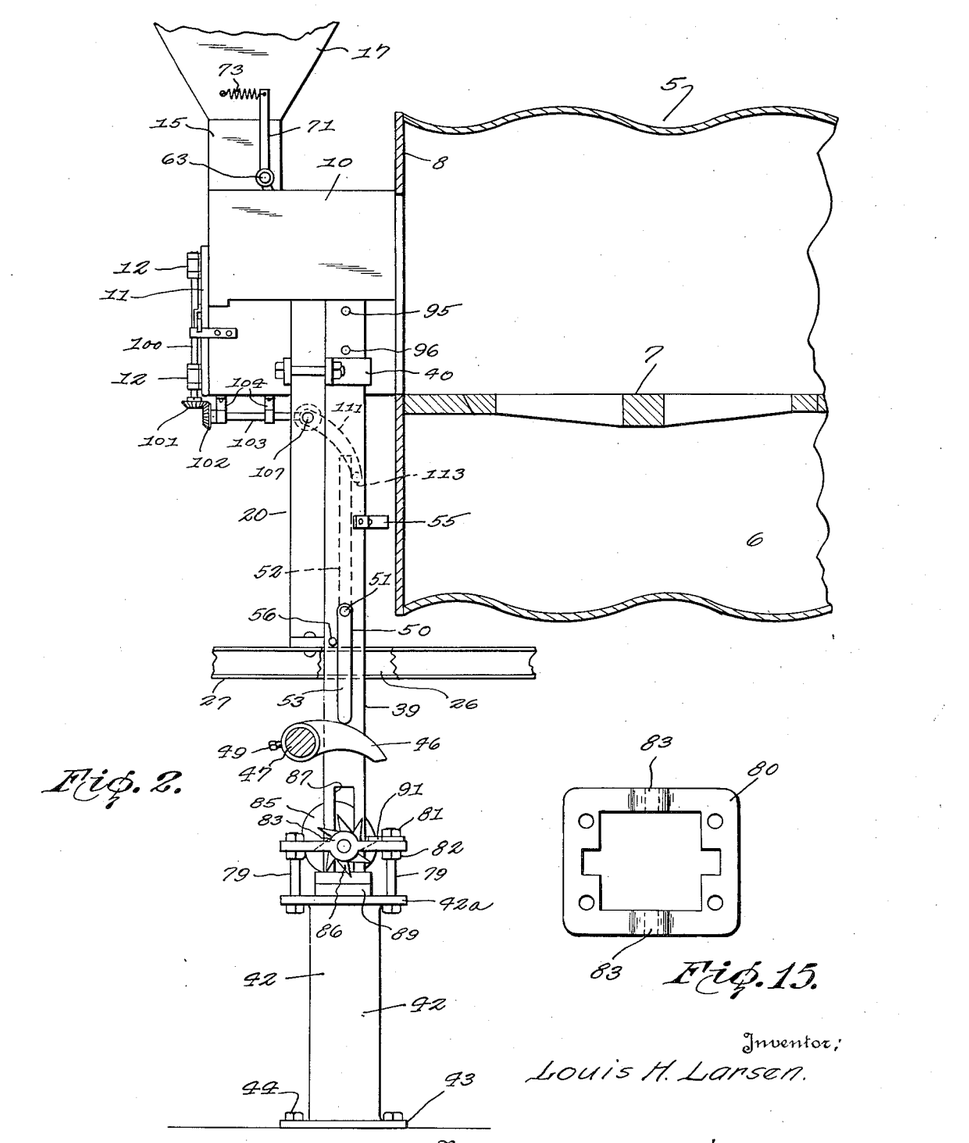
Fig. 2 is a side elevation thereof with the boiler shown in section.
Fig. 15 is a plan view of the frame for supporting certain cam and ratchet means above the cylinder at the base of the stoker.

Said spring 54 also serves to restore said abutment 50 to its erect position shown in Fig. 2 after the same has been oscillated by certain door-operated means, as will presently appear.

Figures 8, 14, 16:
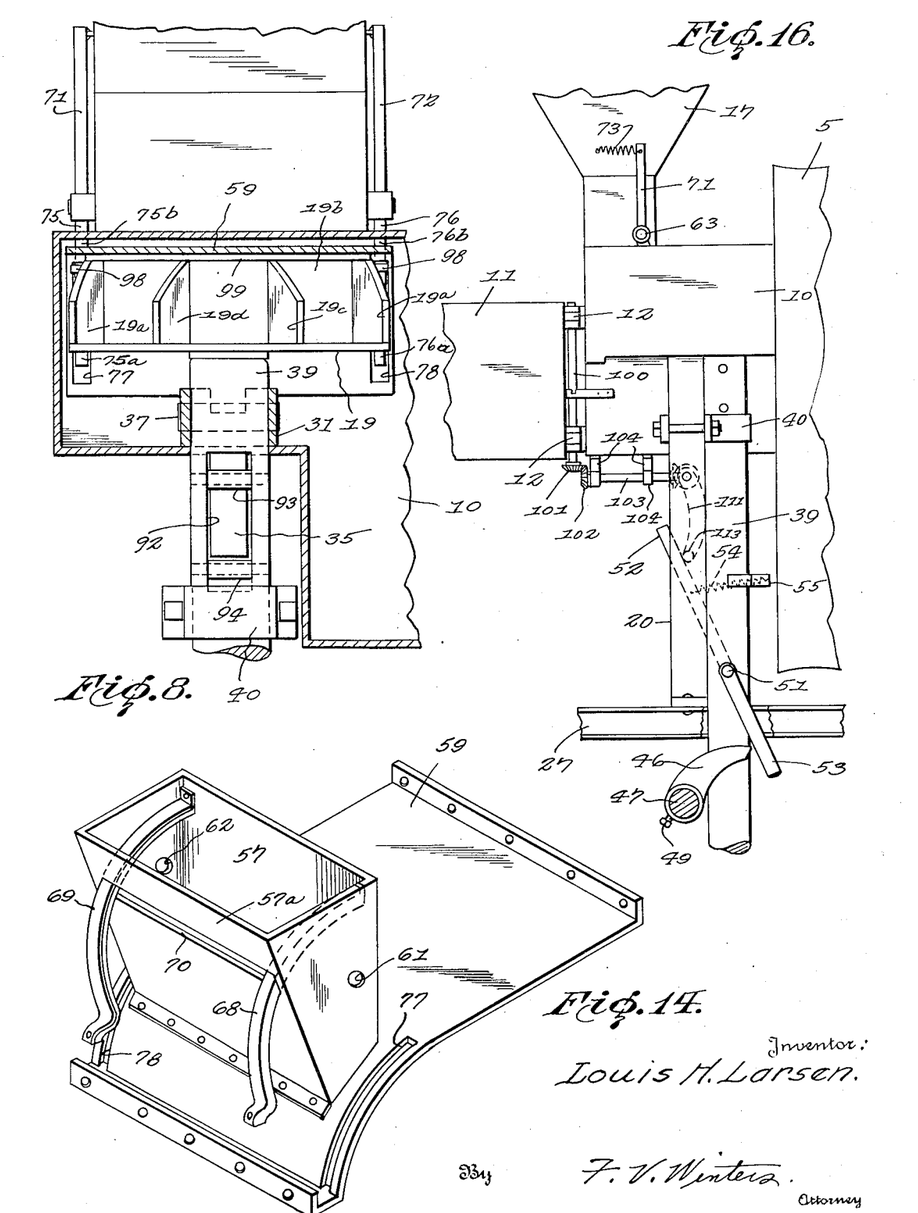
Fig. 8 is a sectional view taken on the line 8—8 of Fig. 3.
Fig. 14 is a perspective view of the metering device with the shutter and its operating means removed.
Fig. 16 is a side elevation of a portion of the stoker and showing certain door-operating means in a position to render the stoker inoperative.

Reverting now to the casing 10, with special reference to the extensions 15 and 16, it is pointed out that each extension is adapted to house a portion of a metering device whereby a predetermined charge of fuel may be taken from each of the hoppers 17 and 18 and discharged into the shovels during the rearward oscillation of said shovels. Each of said metering devices comprises a receptacle portion 57 having its open top portion communicating with its associated hopper and possessing a smaller discharge opening 58 at its base. Said receptacle is supported by a plate 59, suitably attached to the casing as indicated at 60, that portion of said plate 59, adjacent said discharge opening 58 being curved to conform to the swing of the shovel, as will be clearly seen in Fig. 3. On inspection of Fig. 14 it will be seen that the sides of the receptacle are apertured as at 61 and 62 for the reception of trunnions 63 and 64 (see Fig. 6), said trunnions having affixed thereto arms 65 and 66 which support an arcuate shutter 67 adapted to be oscillated in guides 68 and 69. In Fig. 14 the rear wall 57a, of said receptacle 57, is shown as provided with a slot 70 to permit the passage of said shutter 67 during the operation of said metering device. Said trunnions 63 and 64 also carry arms 71 and 72 respectively, springs 73 and 74 being employed to maintain these arms in the positions indicated in Fig. 3, whilst the portions 75 and 76 of said arms extend through the casing and project through slots 77 and 78 in said plate 59, as shown in Fig. 6. As will presently appear said arms 75 and 76 are specially shaped and adapted to cooperate with the shovels to operate the metering devices.

Figure 12:
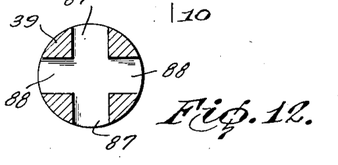
Fig. 12 is a sectional view taken on line 12—12 of Fig. 11.

Each of said cylinders 42 is provided with a top flange 42a which is apertured for the reception of bolts 79 which support a frame 80 in spaced relation above said flange 42a. Nuts 81 and 82 are employed for this purpose. As shown in Figs. 2 and 15, said frame is provided with alined bearings 83 for the reception of a stub shaft 84 to which latter is affixed a cam 85 and a ratchet wheel 86, said shaft extending through slot 87 in said rod 39 and said cam operating in slot 88 in said rod 39. As shown in Fig. 12, said slots 87 and 88 intersect one another and are also somewhat elongated to take care of the reciprocatory movement of said rod 39. A slidable block 89 extends into said cylinder 42, said block encircling said rod 39 with its top portion abutting said cam 85, while its bottom portion is engaged by a spring 90 which encircles said rod 39 between said head 41 and said block 89, as shown in Figs. 9 to 11 inclusive. A leaf spring 91 is affixed to frame 80, as shown in Fig. 2 to prevent retrograde movement of said ratchet wheel 86, as will appear hereinafter.

The projection 35 of bracket 33 which extends between the branches 28 and 29 of standard 20, also projects into a slot 92 in the upper portion of said rod 39, (see Fig. 8), where the top and bottom faces of said projection engage antifriction rollers 93 and 94 carried by pins 95 and 96.

After the the shovels 19 have discharged their loads of fuel into the furnaces, said shovels and their operating parts are in the positions indicated in Figs. 2 and 3. That is, the upper end face of said rods 39 abut the web portions 33a of said brackets 33, (see Fig. 3), whereas the head portions 41 of said rods 39 engage springs 97 positioned in the base of each of the cylinders 42, as shown in Figs. 9 and 10. In view of this arrangement, the shovels 19 are supported in a manner to prevent vibration or the like, during or after the discharge of the fuel into the furnaces.

It is now apparent that as the pairs of wipers 45—46 rotate to the position indicated in Fig. 2, they encounter the extremities of the legs 52 and 53 of the pivoted abutments 50, and since the abutments are maintained in an erect position, as explained hereinbefore, said abutments and the rods 39 are elevated, while the projection 35 of said bracket 33 is encountered by roller 94 thus oscillating the shovel 19 about its pivot 37. As shown in Figs. 3 and 7, each of the shovels 19 is provided with projections 98 which extend laterally from the side walls of the shovels and while in the position indicated in said Fig. 3 said projections 98 abut the inner curved surface of said arms 75 and 76 in view of the springs 73 and 74 connected to arms 71 and 72 and as shown in Fig. 3, the shutter 67 has been oscillated to permit the entrance of the fuel from the hoppers 17 and 18 to the receptacles 57 of the metering devices. When the shovels are in the position shown in Fig. 3, the lip 99 closes the discharge mouth 58 of the receptacles and hence the passage of the fuel is prevented. Said lip 99 also extends over a portion of the top of the shovels as indicated in dotted lines in said Fig. 3 and also in Fig. 7.

Figure 4:
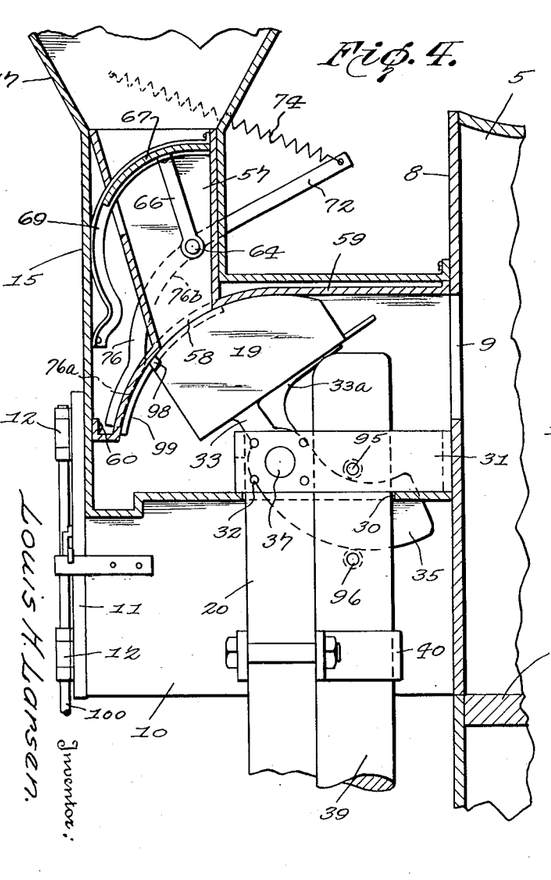
Fig. 4 is a similar view but showing one of the shovels in an oscillated position toward the front of the casing.

The continued elevation of said rods 39 oscillates the shovels 19 to the position shown in Fig. 4 wherein it will be noted that the projections 98 of shovels 19 have engaged the arms 75—76 to oscillate the shutter 67 to the position shown, thus closing the upper portion of the receptacles and shutting off the passage of fuel thereto. However, the lips 99, that is, the portions thereof that overlie the top of the shovels 19 still close the discharge mouths 58 of said receptacles and hence only that portion of the fuel between said lips and shutters 67 may eventually pass into the shovels. This quantity of fuel is measured and will be an amount equal to the capacity of the shovels. As the rods 39 continue their upward travel, the shovels are finally oscillated to the position shown in Fig. 5 wherein it will be noted that the lip 99 has passed beyond the discharge mouth 58 whereupon the charge of fuel is dropped into the shovels. While the shovels are oscillating from the positions shown in Fig. 4 and Fig. 5, the shutter 67 remains in the position indicated, since the projections 98 engage the curved surfaces 75a and 76a of the arms 75 and 76 and as the radii of said curved surfaces corresponds with the radial swing of said projections no motion is imparted to said arms. During the elevation of said rods 39, their heads 41, in said cylinders 42, (see Fig. 11) have risen to the point indicated thus tensioning the spring 90, which, it will be recalled is positioned between the heads 41 and the blocks 89, said latter elements being in constant contact with the cams 85. When the rods 39 have travelled upwardly, said wipers 45—46 are finally freed from contact with the legs 52 and 53 and hence the stored energy in said springs 90 forces said rods 39 to descend rather abruptly. At this time the roller 93 engages the arcuate face of said projection 35 whereupon the shovels return to the position shown in Fig. 3 and their charges of fuel are thrown into the furnaces.

Figure 5:
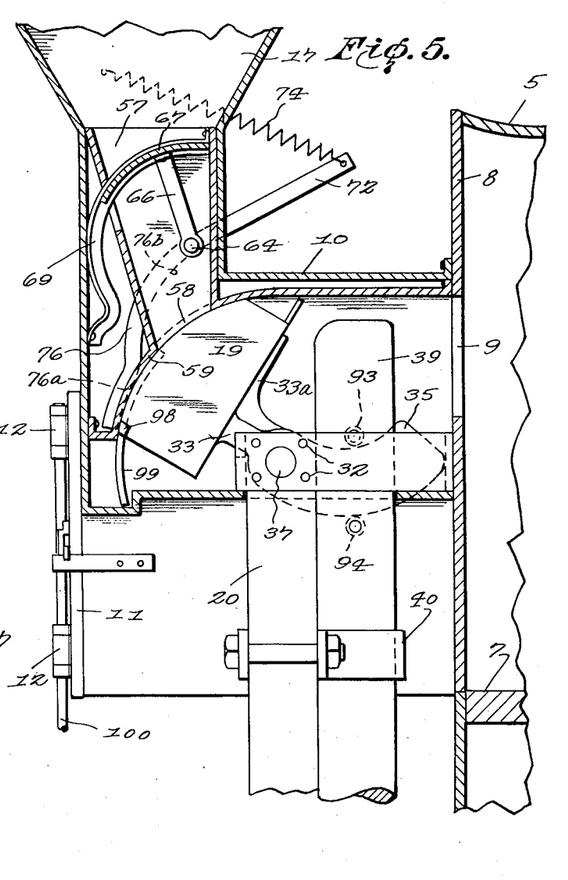
Fig. 5 is a view like unto Fig. 4 but illustrating the extreme oscillated position of a shovel about to receive a charge of fuel from the metering device thereabove.

When the shovels 19 oscillate from the position shown in Fig. 5 to the position shown in Fig. 3, the springs 73 and 74, connected to arms 71 and 72, cause the arms 75 and 76 to follow the movement of the shovels and as soon as the projections 98 of shovels 19 reach the curved surfaces 75b and 76b of said arms 75 and 76, the shutter 67 will oscillate rearwardly to the position shown in Fig. 3, thus permitting the passage of another quantity of coal or similar fuel to the receptacle 57. Just prior to this movement of the shutter, it will be seen that the lip 99 closes the discharge mouth 58 of said receptacle, as shown in Fig. 4.

Each of the shovels 19 is specially formed to discharge its load of fuel in a sort of fan-like formation over the fire bed, and in this connection it will be observed that the sides 19a of the shovels are flared outwardly toward the discharge end thereof and that the back portions 19b are arcuately disposed in plan view (see Fig. 7). This arrangement assures the desired fan-like formation referred to hereinbefore. Further, in order that the charge of fuel may be evenly deposited in the shovels, I propose to provide partitions 19c and 19d, said partitions diverging from the rear of the shovels as clearly shown in Figs. 7 and 8.

From the foregoing it will be seen that the rotation of the wipers 45 and 46 cause the elevation of said rods 39 and the rearward swing of the shovels to the position indicated in Fig. 5.

Also the compressing of the springs 90 in said cylinders 42 causes the rods to be reciprocated downwardly, thus restoring the shovels to the position indicated in Fig. 3, and thus literally throwing the contents of the shovels into the furnaces.

While said springs 90 admirably perform their function of swinging the shovels to their discharging positions, it is obvious that the discharged fuel would eventually pile up over the grate, and as this is an undesirable feature, I propose to supply a mechanism wherein the throw of the shovels may be varied so that the fuel will be discharged progressively from the front to the rear of the furnace and vice versa.

In this connection attention is directed to Figs. 2, 10 and 11, wherein it will be observed that the teeth of ratchet wheel 86 are in the orbital path of the wipers 46, so that each rotation of said wipers causes said ratchet wheel 86 to be partially rotated. This partial rotation is communicated to cam 85, which, it will be recalled is pinned to the shaft 84 also carrying said ratchet wheel 86. As the cam 85 engages the top edge of said block 89 it will be noted that said block will be reciprocated upwardly or downwardly in accordance with the eccentric surface of the cam. When the cam 85 is in the position indicated in Fig. 10, said block 89 has reached its highest position and it is obvious that the intermittent contact between the wipers and the ratchet wheel will gradually rotate said cam to the position shown in Fig. 11, wherein the cam has depressed said block to its lowest position. Hence, said block will assume a plurality of positions between its elevated and lowered positions and as each of these locations varies the distance between the bottom face of the block and the head 41 of the rod 39, it is obvious that the spring 90 will likewise have its compression varied. The compression of the spring creates the energy for swinging the shovels to their discharge positions and hence it is apparent that the movements of said block 89 will assure this variance in the compression of the spring.

It should be remembered that the operation of the wipers elevates the rods 39 and the springs 90 lowers said rods, these operations occuring during a single rotation of said wipers. Also that a wiper encounters the teeth of ratchet wheel 86 during this rotation. Hence, it is apparent that said ratchet wheel 86 is only advanced a single tooth during the rise and fall of said rods 39. As pointed out hereinbefore, I provide a spring 91 to prevent retrograde movement of said ratchet wheel 86, for obvious reasons.

In view of the foregoing arrangement, the throw of the shovels varies in accordance with the amount of the compression of said springs 90, and it is obvious a weaker throw of the shovel will cause its contents to be discharged adjacent the front of the furnace, and as the throw is increased the charge of fuel will be deposited progressively from the front to the back of said furnace. This is a feature of some importance.

While my improved stoker is sturdy in construction and is rather simple in construction, some repair work may be necessary during its operation. Also at times it might be desirable to inspect the interior of the casing. Under these circumstances it is vital that means be provided to render the mechanism temporarily inoperative, and as a temporary failure of the apparatus necessitates a resort to hand-firing, it is desirable that such mechanism find its source of operation in the door 11 which closes the front of said casing 10.

To this end I have provided a rod 100, which passes through the hinged connection of said door 11 whereby said rod is rotated during the opening and closing of said door. Said rod 100 is provided with a bevel gear 101 which meshes with a similar gear 102 carried by shaft 103, suitably supported by brackets 104. The other end of said shaft 103 is provided with a gear 105 enmeshed with gear 106 mounted on the transverse shaft 107, the ends of the latter being journalled in the standards 20 as indicated at 108 and 109 (see Fig. 6). Said shaft 107 carries affixed arms 110 and 111 each being provided with an extension 112 and 113 respectively, said extensions engaging the inner edge of the legs 52, as clearly shown in Figs. 1 and 6. Obviously, when door 11 is opened the rotation of said rod 100 is communicated to shaft 107 through the intermediary of the gearing just described and thus the arms 110 and 111 are oscillated to the position shown in Fig. 16, and it will be noted that this movement oscillates the legs 52 of abutment 50 so that the said legs 52 and the legs 53 are removed from the path of the wipers 45—46. Thus, the reciprocation of the rods 39 is temporarily stopped and the stoker remains inoperative, when said door 11 is opened. When the door is closed, the springs 54 returns the abutments 50 to their normal or erect position and so the stoker now becomes operative. Said springs 54 constantly urge the legs 52 into contact with the extensions 112 and 113 of said arms 110 and 111 and so said extensions cooperate to maintain said legs 52 in the erect position hereinbefore mentioned.

Figure 17:
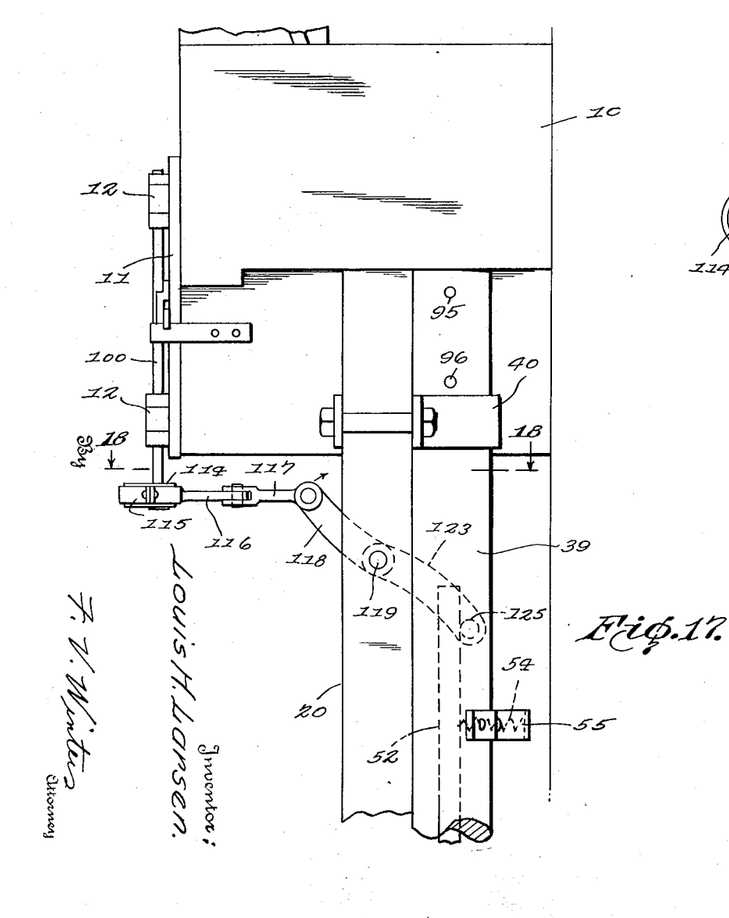
Fig. 17 is a partial side elevation of the stoker illustrating a slightly modified form of door-operated means to render the stoker inoperative.
Figure 18:
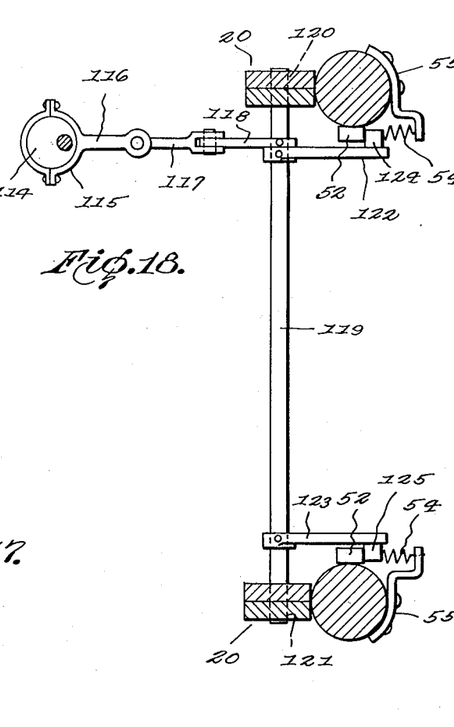
Fig. 18 is a sectional view taken on the line 18—18 of Fig. 17.

In Figs. 17 and 18 there is shown a slightly modified form of door-operated means for rendering the stoker inoperative. In this form the rod 100 is provided with an eccentric 114 at its lower end said eccentric being embraced by a strap 115 including a projection 116 pivotally connected to link 117, and as shown in Fig. 18, said link is also pivotally joined to an arm 118, the latter having one end affixed to the transverse shaft 119 journalled in standards 20 as at 120 and 121. Rocker arms 122 and 123 are also splined to said shaft 119, said arms being provided with projections 124 and 125 respectively which engage the inner edges of said legs 52. As the opening of the door 11 rotates said rod 100 it is obvious that this movement will be communicated to eccentric 114 whereupon the link 117 oscillates in the direction of the arrow thus oscillating shaft 119 and also rocker arms 122 so that their projections encounter said legs 52 and rotates the abutments 50 out of the path of the wipers, as in the form just described.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. In an automatic stoker for boilers, the combination of a fire box having an opening therein, a shovel casing positioned in front of said opening, an oscillatory shovel in said casing, a reciprocatory rod operatively connected to said shovel, said rod having a head, means for elevating said rod to swing said shovel in one direction, a cylinder housing the head of said rod, a block slidably mounted on said rod, a spring encircling said rod between said block and said head, a cam for varying the compression of said spring to progressively vary the throw of said shovel, and means intermittently transmitting motion from said rod-elevating means to said cam.

2. In an automatic stoker for boilers, the combination of a fire box having an opening therein, a shovel casing positioned in front of said opening, a door for said casing, an oscillatory shovel in said casing, a reciprocatory rod operatively connected to said shovel, an abutment pivoted to said rod, means engageable with said abutment to elevate said rod to swing said shovel in one direction, means for swinging the shovel in the opposite direction and door-operated mechanism adapted to move said abutment out of the path of said shovel operating means to render the stoker inoperative.

3. In an automatic stoker for boilers, the combination of a fire box having an opening therein, a shovel casing positioned in front of said opening, a door for said casing, an oscillatory shovel in said casing, a reciprocatory rod operatively connected to said shovel, an abutment pivoted to said rod, a rotatable wiper engageable with said abutment to elevate said rod to swing said shovel in one direction, means under the control of said wiper for swinging the shovel in the opposite direction at varying speeds, and door-operated mechanism adapted to move said abutment out of the path of said wiper to render the shovel inoperative.

LOUIS H. LARSEN.